United States Patent [19]

Sato

[11] 4,005,725
[45] Feb. 1, 1977

[54] AUTOMATIC CLOSURE VALVE FOR WATER SPRINKLER

[75] Inventor: Fusamatsu Sato, Tokyo, Japan

[73] Assignee: Fujiki Denki Kabushiki Kaisha, Tokyo, Japan

[22] Filed: Jan. 6, 1976

[21] Appl. No.: 646,768

[30] Foreign Application Priority Data

Nov. 13, 1975 Japan .............................. 50-154632

[52] U.S. Cl. .............................. 137/112; 137/217; 137/596.2; 137/612.1
[51] Int. Cl.² ............................................. F16K 45/00
[58] Field of Search ............... 137/218, 484.8, 107, 137/112, 217, 596.2, 612.1

[56] References Cited

UNITED STATES PATENTS

| 2,159,056 | 5/1939 | Sloan | 137/218 |
|---|---|---|---|
| 2,503,424 | 4/1950 | Snyder | 137/218 |
| 2,929,394 | 3/1960 | Wenner | 137/107 |
| 3,204,657 | 9/1965 | Boyd | 137/484.8 |

Primary Examiner—Alan Cohan
Assistant Examiner—Gerald A. Michalsky
Attorney, Agent, or Firm—Polster and Polster

[57] ABSTRACT

An automatic closure valve for water sprinkler which enables water from a water tap to be used without even necessity for stopping the tap and removing the sprinkler and water hose and enables water remaining in the hose and the closure valve to be automatically drained off after the water sprinkling, the closure valve being constructed with a valve casing, in which there are provided two valve chambers defined in mutual contiguity and communicated each other by means of a passage; a closure valve mechanism for closing the passage in response to increased pressure of water in the valve chambers; an opening which communicates the valve chambers and the external atmosphere; and a valve means which usually closes the opening by the water pressure, and opens the same when the pressure in the valve chambers becomes negative.

2 Claims, 4 Drawing Figures

AUTOMATIC CLOSURE VALVE FOR WATER SPRINKLER

BACKGROUND OF THE INVENTION a. Field of the Invention

The present invention is concerned with an automatic closure valve for water sprinkler, and, more particularly, it relates to an improved construction of the water sprinkler to enable switching over of the sprinkling operation to be done very easily.

b. Description of Prior Arts

When sprinkling water on gardens, horticultural field, and so on, if a water tap is installed at a place fairly distant from the place for the watering, a certain time lag should inevitably occur from the time the water tap is open until the water is ejected from the sprinkler, or from the time after completion of the sprinkling until the water tap is closed, which causes waste of water.

In order to avoid such water loss, an automatic closure valve is fitted to the water tap, and a water hose provided at its tip end with a water tap is connected to a connecting pipe at the outlet side of the valve. In this manner, after completion of the water sprinkling, when the water tap is closed, and the water pressure within the hose rises, the valve is automatically closed in response to the water pressure to stop the supply of water, thereby preventing water from being wasted.

However, in case the abovementioned closure valve is fitted to the water tap, the water hose must be removed therefrom at every time water is to be used by the water tap. Further, there would occur such circumstance that the water supply cannot be taken from the water tap during the water sprinkling. Moreover, in cold regions, water which remains in both closure valve and hose should be perfectly drained off after the water sprinkling, otherwise the water therewith becomes frozen to make it impossible to use the valve and hose thereafter.

SUMMARY OF THE INVENTION

With the various problematical points as described in the foregoing being taken into consideration, it is a primary object of the present invention to provide an automatic closure valve for a water sprinkler which enables the water supply to be taken from one and the same water tap even during the water sprinkling operation.

It is a secondary object of the present invention to provide an automatic closure valve for a water sprinkler which is so constructed that water remaining within the hose and the closure valve is automatically drained off to prevent these hose and valve from being damaged due to freezing.

The foregoing objects, other objects, and the specific construction and operations of the automatic closure valve for water sprinkler according to the present invention will become more apparently understandable from the following detailed description of a preferred embodiment thereof, when read in conjunction with the accompanying drawing.

DETAILED DESCRIPTION OF PREFERRED EMBODIMENT

Figure 1:
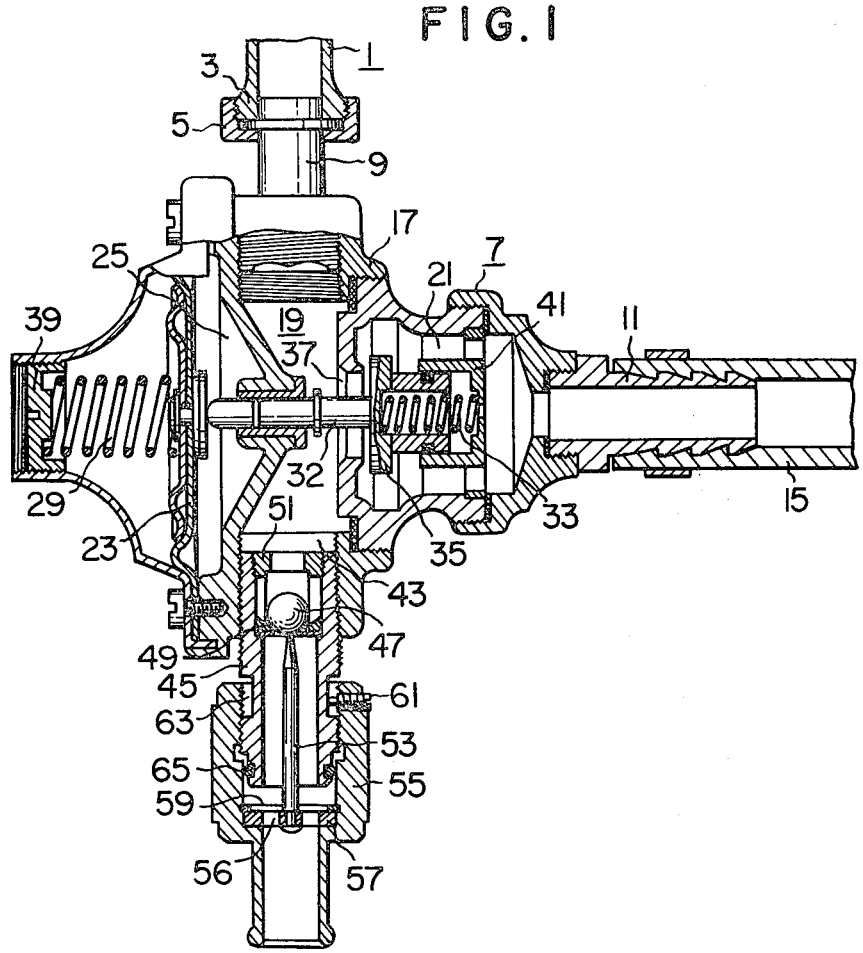
FIG. 1 is a longitudinal cross-sectional view of the automatic closure valve according to the present invention.
Figure 3:
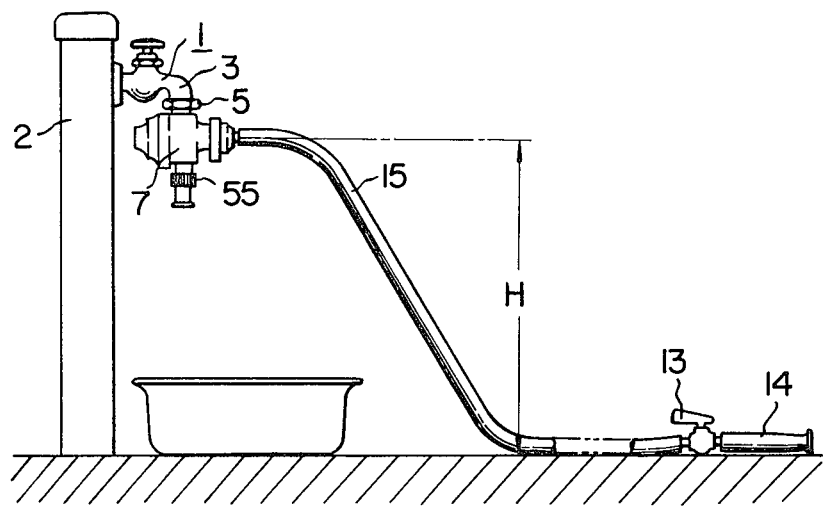
FIG. 3 is a general view, wherein the automatic closure valve shown in FIG. 1 is fitted to the water tap for actual use.

As shown in FIGS. 1 and 3, a connecting tube 9 of the automatic closure valve 7 according to the present invention is fitted to an outlet 3 of a water tap 1 supported on a supporting column 2 by means of a cap nut 5. On the other hand, a hose 15 is connected with a connecting tube 11 at the outlet side of the closure valve 7 disposed in the direction orthogonal to the connecting tube 9. The hose 15 at the tip end thereof opposite to the end connected with the connecting tube 9 is provided with a water sprinkling nozzle 14 having a control cock 13.

Figure 2:
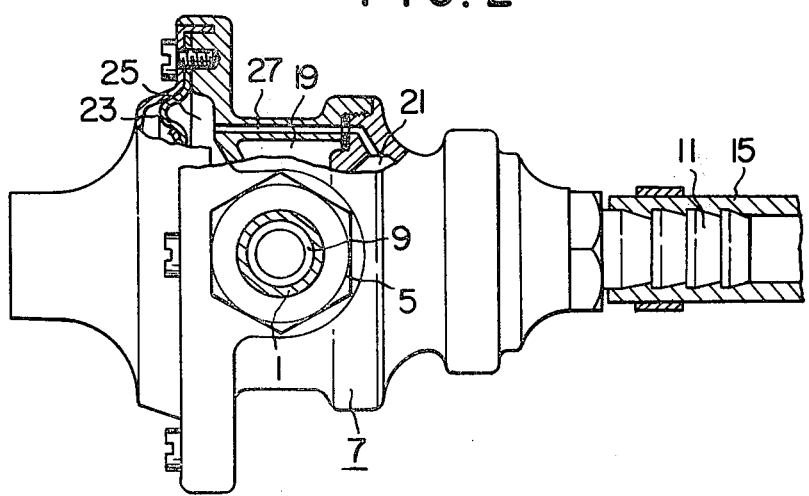
FIG. 2 is a top plan view of the automatic closure valve for water sprinkler shown in FIG. 1 with a part being cut away.

When water supply tap 1 is opened for sprinkling water in a state of the cock 13 being closed, water is fed into the hose 15 through valve chambers 19 and 21 in a valve case 17 of the automatic closure valve 7 shown in FIG. 1. In supplying water into the hose 15 in the abovementioned state, if the water pressure within the hose 15 becomes increased, the pressurized water in the valve chamber 21 to the outlet side of the valve acts on a pressure chamber 25 provided with a diaphragm 23 through a small passage hole 27 as shown in FIG. 2, and comprises a spring 29 by way of the diaphragm 23. By the compression of the spring 29, a valve rod 32 which is slidably held in a partition wall 31 moves to the left, as viewed from the top surface of the drawing figure, by another spring 33 which is weaker than the spring 29, whereby a communicating port 37 between the two valve chambers 19 and 21 is closed by a valve 35, to which one end of the valve rod 32 is connected. Subsequently, when the cock 13 for the nozzle 14 is opened, water is slightly ejected from the nozzle by the pressure of water in the hose. Upon ejection of water, the pressure within the hose is reduced, and the valve 35 returns to its original position by the expanding force of the spring 29 in conjunction with the restitutive force of the spring 33 to open the communicating port 37, as the result of which water supplied from the water tap 1 passes through the valve chamber 19, the communicating port 37, and the valve chamber 21 in sequence, and ejects from the tip end of the nozzle 14 to thereby effect water sprinkling.

After the sprinkling, when the cock 13 is closed, the water pressure within the hose increases as already stated in the foregoing, whereby the valve 35 closes the communicating port 37 within the valve case 17 to stop supply of water to the hose and to simultaneously prevent the hose 15 from getting off the connecting tube 11 as well as from breakage due to excessive pressure or freezing of water within the hose.

The spring 29 is of such strength that a spring receiver 39 may be adjusted by its movement back and forth. For the spring 33 which moves the valve 35 and its valve rod 32 back and forth, there is provided another spring receiver 41, whereby the valve 35 is held in a slidable manner.

In addition to the automatic closure valve of the afore-described construction, there is formed an opening 43 in the direction of the same axial line as that of the connecting tube 9 for the water tap, into which a tube 45 to communicate the valve chamber 19 with outside is screw-fitted. Within the communicating tube 45, there is provided a valve mechanism consisting of a valve 47 such as, for example, a ball valve which opens when the valve chamber 19 is in a negative pressure, a valve seat 49, and a stopper 51. On the outer periphery of the communicating tube 45, there is screw-fitted in a vertically slidable manner an outlet tube 55 having therewithin a pushing rod 53 to push the ball valve 47 upward to manually open and close the valve mechanism. The pushing rod 53 is held within the outlet tube 55 in such a manner that its bottom end is fitted into a boss or hub of a wheel-shaped supporting plate 57 having opening 56 which, in turn, is fixed at a stepped portion formed within the inner peripheral surface of the outlet tube 55 by means of a stopper ring 59. The outlet tube 55 is further secured to the outer periphery of the communicating tube 45 by a stopper screw 61 so as not to get off the connecting tube through an unexpected sliding. The tip of the stopper screw 61 is engaged with an annular groove 63 formed on one peripheral part of the connecting tube 45. In order to secure water-tightness between the communicating tube 45 and the outlet tube 55, an O-shaped seal ring 65 is interposed therebetween.

In case only the water sprinkling is to be carried out, the water tap 1 is opened in a state of the ball valve 47 being closed, and then the cock 13 for the nozzle 14 is opened, whereby the water supply for the sprinkling can be done in the afore-described manner. After the sprinkling, when the cock 13 for the nozzle 14 is closed, then the water tap 1 is closed, and the cock 13 of the hose is again opened, a part of water remaining in the hose 15 is drained off by the head H to be created between the closure valve 7 and the ground surface. At the same time, a part of water in the valve chambers 19 and 20 is drained with the consequence that there occurs a negative pressure within the chambers to thereby open the ball valve, whereupon external air flows into the valve chambers simultaneously with draining off of water in the valve chamber 19 outside through the communicating tube 45. Thus, the external air and the residual water are exchanged. As the result of this, due to a large atmospheric pressure created within the valve chamber, most part of the water remaining in the hose is drained out of the tip end of the nozzle 14.

Since, according to the valve device of the present invention, no water remains in the valve chambers and hose, effective result can be obtained particularly in cold regions.

When the hose is extremely long, it is advisable that the draining of water be done by sending air into the valve chambers from the communicating tube 45 or the outlet tube 55 by means of a bellow, etc..

Also, when water is to be taken from the water tap during the sprinkling, the outlet tube 55 is operated to push the ball valve 47 upward by the pushing rod 53 to open the same, whereby water flows out of the outlet 55 through the communicating tube 45.

Figure 4:
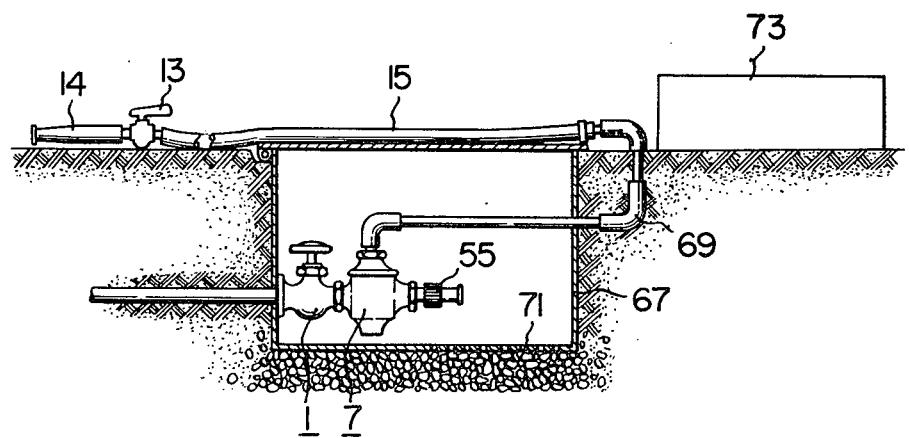
FIG. 4 is another general view showing different mode of use of the automatic closure valve according to the present invention.

Furthermore, in the construction as shown in FIG. 4, wherein the water tap 1 and the closure valve 7 are provided in a box buried underground so that water is supplied to the hose 15, the water tap 1 is closed after the water sprinkling, and the outlet tube 55 is operated in a state of the cock 13 of the hose being opened to thereby open the ball valve 47, whereupon most part of water in the hose 15 is drained into the underground box from the outlet tube 55 and penetrates into the ground through the draining holes 71. In this case, if the hose 15 is raised to a slightly higher level, or is placed on a table 73 by being coild, drainage of water can be done more rapidly.

Although the present invention has been described with reference to a particular embodiment thereof, it should be noted that the embodiment is merely illustrative and not restrictive, and that any change and modification may be made by those skilled in the art without departing from the spirit and scope of the present invention as set forth in the appended claims.

What is claimed is:

1. An automatic closure valve for water sprinkler which comprises in combination; a valve casing having inlet and outlet for water supply from a water tap; a connecting means for connecting the water tap with the inlet of said valve casing; another connecting means provided at the outlet of said valve casing; a first valve chamber defined in said valve casing at the inlet side thereof; a second valve chamber defined in said valve casing at the outlet side thereof; a passage defined between said first and second valve chambers and for communicating said both valve chambers; means for closing said communicating passage in response to increase in water pressure in said second valve chamber; an opening or port provided in said valve casing to communicate said valve chamber at the inlet side with the external atmosphere; a communicating tube fitted at said opening; a ball valve provided in said communicating tube and which usually closes said opening under water pressure, and opens said opening when the pressure within said valve chamber becomes negative; an outlet tube fitted to said communicating tube in a manner movable back and forth; and a pushing rod to manually open said ball valve.

2. The automatic closure valve as claimed in claim 1, wherein said means for closing said communicating passage between said first and second valve chambers comprises: a pressure chamber adjacent to said first valve chamber at the inlet side; a diaphragm in said pressure chamber; a spring means attached to said diaphragm to return the same to the original position thereof; a closure valve disposed in said second valve chamber at the outlet side in a slidable manner by a spring force; a valve rod fixed at one end thereof to said closure valve and extending through said communicating passage and said first valve chamber upto said diaphragm in said pressure chamber; and a communicating path provided between said second valve chamber and said pressure chamber to cause pressurized water in said second valve chamber to flow into said pressure chamber to push said diaphragm and to simultaneously cause said closure valve to move following the diaphragm movement to close said communicating passage.

* * * * *